United States Patent
Steinbrenner et al.

(10) Patent No.: US 6,371,079 B1
(45) Date of Patent: Apr. 16, 2002

(54) METHOD AND ARRANGEMENT FOR SYNCHRONIZING AT LEAST TWO POWER ADJUSTING ELEMENTS OF AN INTERNAL COMBUSTION ENGINE

(75) Inventors: Ulrich Steinbrenner, Stuttgart; Juergen Gras, Bietigheim-Bissingen; Werner Jaksch, Hessigheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/697,283

(22) Filed: Oct. 27, 2000

(30) Foreign Application Priority Data

Oct. 27, 1999 (DE) .......................................... 199 51 582

(51) Int. Cl.$^7$ ............................................. F02D 9/10
(52) U.S. Cl. .................... 123/336; 123/399; 123/580
(58) Field of Search ................. 133/399, 336, 133/580, 432, 361

(56) References Cited

U.S. PATENT DOCUMENTS

| | | | | |
|---|---|---|---|---|
| 4,109,634 A | * | 8/1978 | Garabedian | 123/198 F |
| 4,200,083 A | * | 4/1980 | Ishida | 123/198 F |
| 4,773,372 A | | 9/1988 | Stumm et al. | |
| 5,027,769 A | * | 7/1991 | Yoshida et al. | 123/399 |
| 5,036,816 A | * | 8/1991 | Mann | 123/399 |
| 5,081,962 A | * | 1/1992 | Kurokawa et al. | 123/184.36 |
| 5,209,207 A | * | 5/1993 | Shitani et al. | 123/361 |

* cited by examiner

Primary Examiner—Erick Solis
(74) Attorney, Agent, or Firm—Walter Ottesen

(57) ABSTRACT

The invention is directed to a method and an arrangement for synchronizing at least two power-adjusting elements of an internal combustion engine which are electrically driven independently of each other. For carrying out the synchronization, the intervals between the respective combustions or the corresponding segment times of at least two cylinders are detected to which individual power-adjusting elements are allocated and their deviation is determined. At least one power-adjusting element is adjusted in order to maintain this deviation within a pregiven tolerance band. A correction of the control of the power-adjusting elements is derived in dependence upon the adjustment. The power-adjusting elements are adjusted in mutually opposite directions.

18 Claims, 3 Drawing Sheets

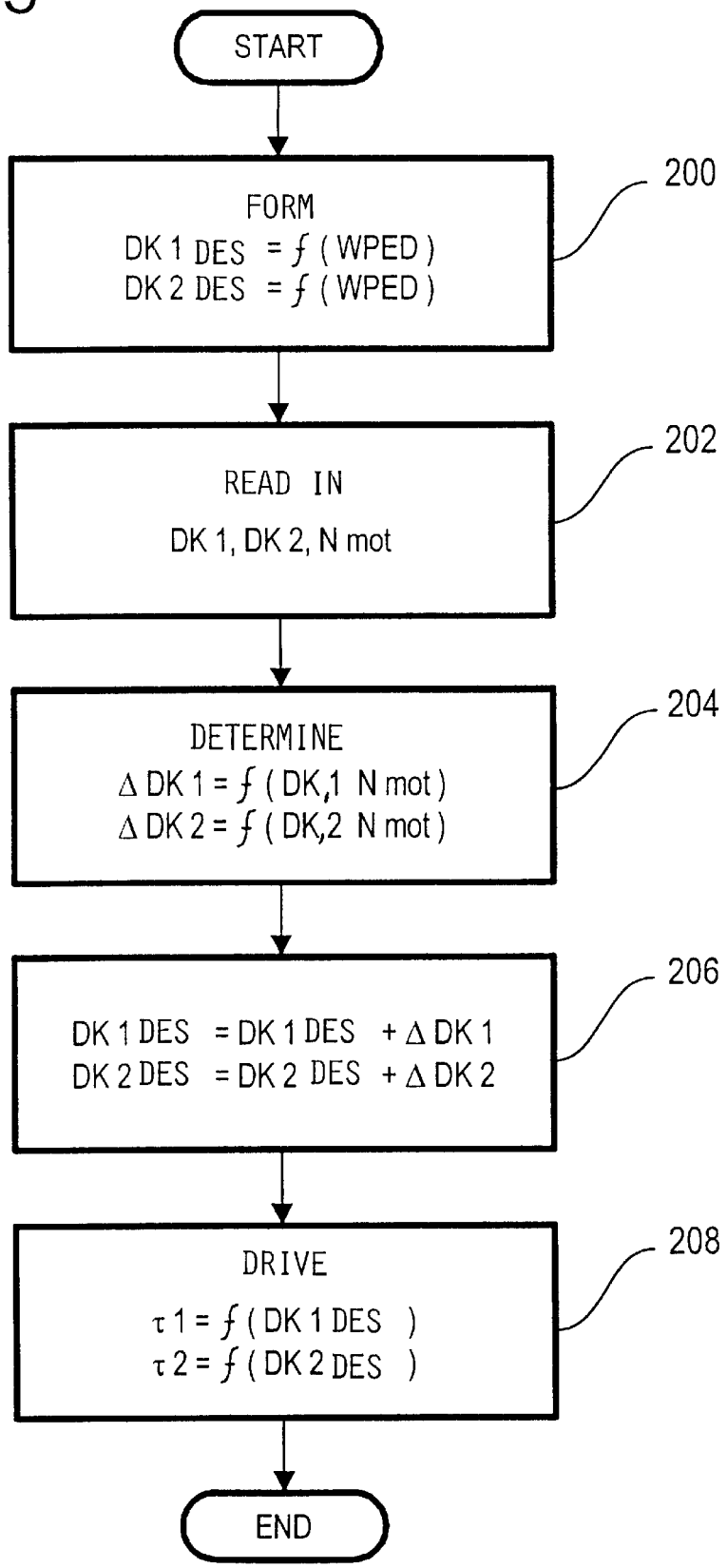

METHOD AND ARRANGEMENT FOR SYNCHRONIZING AT LEAST TWO POWER ADJUSTING ELEMENTS OF AN INTERNAL COMBUSTION ENGINE

BACKGROUND OF THE INVENTION

U.S. Pat. No. 4,722.273 discloses an internal combustion engine with at least two power adjusting elements which are electrically driven independently of each other. In engines of this kind, different torque contributions of the cylinders occur and the air supply of these cylinders is supplied via different power adjusting elements. This is caused by different charges of the cylinders because the supplied air mass flow is, inter alia, dependent upon the geometry of the power adjusting element (the throttle flap) and/or the different characteristic lines of the actual value transducers of the power adjusting element (potentiometers of the throttle flap) in so-called electronic gas-pedal systems. The different cylinder charges and therefore the different torque contributions lead, however, to an operating performance of the engine which is not completely satisfactory.

SUMMARY OF THE INVENTION

It is an object of the invention to provide measures which facilitate an equalization of the individual cylinders.

The method of the invention is for synchronizing at least two power-adjusting elements of an internal combustion engine, the engine including at least first and second power-adjusting elements controlled electrically independently of each other, the first power-adjusting element adjusting the air supplied to at least a first cylinder of the engine and the second power-adjusting element adjusting the air supplied to at least a second cylinder of the engine. The method includes the steps of: determining a quantity representing the deviation of the torque contributions of the cylinders, respectively; carrying out a correction of the position of at least one of the power-adjusting elements on the basis of the quantity to effect a reduction of the deviation; and, adjusting the power-adjusting elements while considering the correction.

A procedure is provided with which the equalization of cylinders or cylinder groups takes place in a simple manner and whose air supply is influenced by power adjusting elements controlled electrically independently of each other. It is a special advantage here that different torque contributions of the cylinders are reduced or avoided with the application of this procedure as a consequence of different charges because of different geometries and characteristic lines in the region of the power adjusting elements.

It is especially advantageous that the equalization is undertaken on the basis of the time-dependent or angular distance of two ignitions of the affected cylinders so that the consideration of additional quantities such as the intake manifold pressure on the cylinders, the air mass flows to the cylinders, et cetera, is not required.

It is especially advantageous that, with a mutually opposing adjustment of the power adjusting elements, a rapid precise correction takes place and therefore the equalization is reliably established.

Especially advantageous is therefore the use in systems wherein no separate air masses are measured and wherein no separate intake manifold pressure data are present. This is especially the case in sport engines having high power so that the described procedure presents special advantages in this area of application.

It is especially advantageous that the equalization of several cylinders is significantly improved and that, in this way, additional further influences on the torque of the individual cylinders can be compensated with these influences being caused by non-uniform compressions, non-uniform air/fuel composition, unequal valve strokes, et cetera.

In an advantageous manner, the synchronization takes place in the context of a separate synchronization operation but also as an adaptation method during the running operation of the vehicle equipped with the engine.

BRIEF DESCRIPTION OF THE DRAWINGS

The invention will now be described with reference to the drawings wherein.

Figure 2:
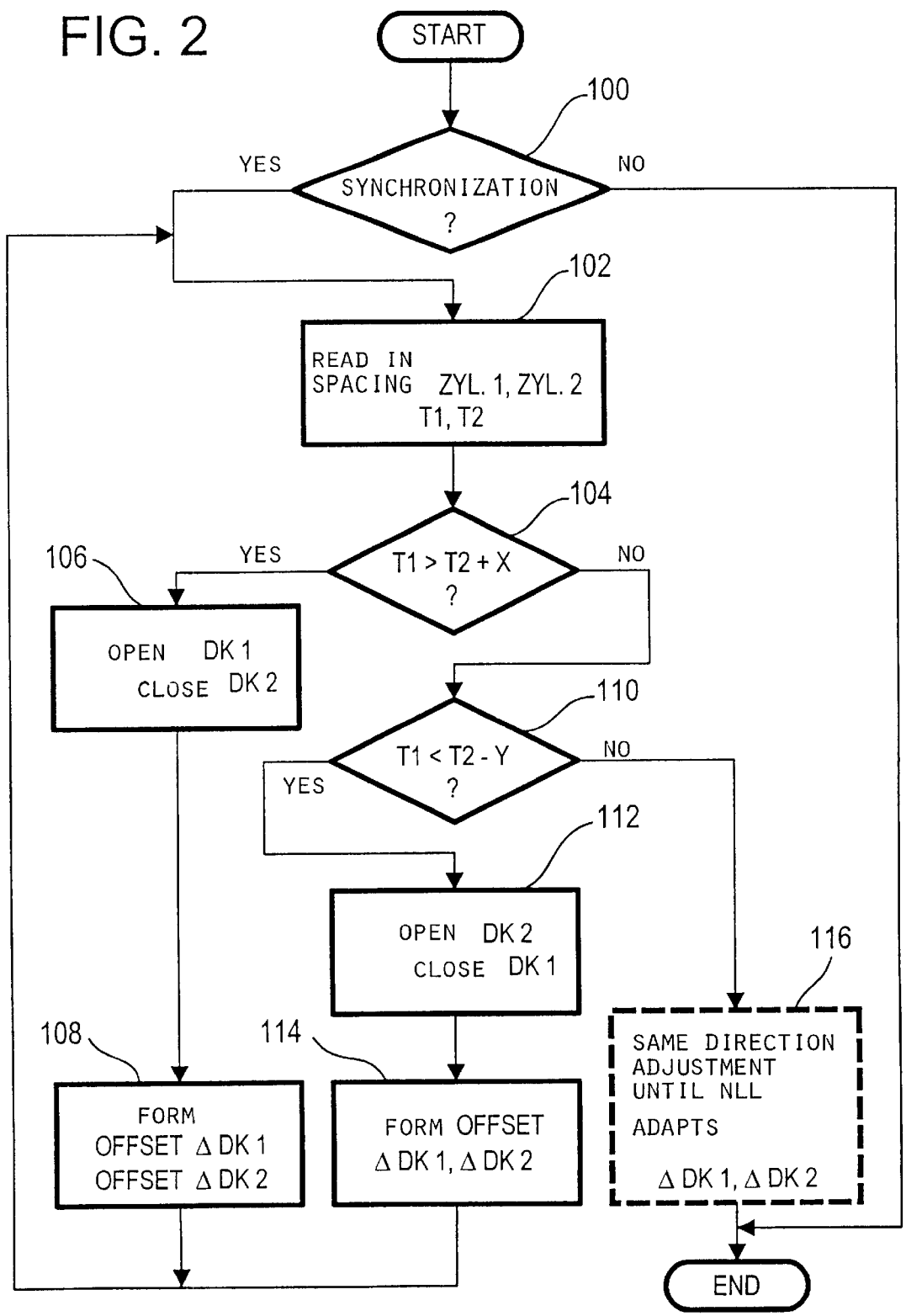
FIG. 2 shows a preferred realization of the synchronization of the power adjusting elements in the context of a flowchart; and, FIG. 3 shows another realization of the synchronization of the power adjusting elements also in the context of a flowchart.

The flowcharts in FIGS. 2 and 3 represent computer programs which execute the synchronization.

DESCRIPTION OF THE PREFERRED EMBODIMENTS OF THE INVENTION

Figure 1:
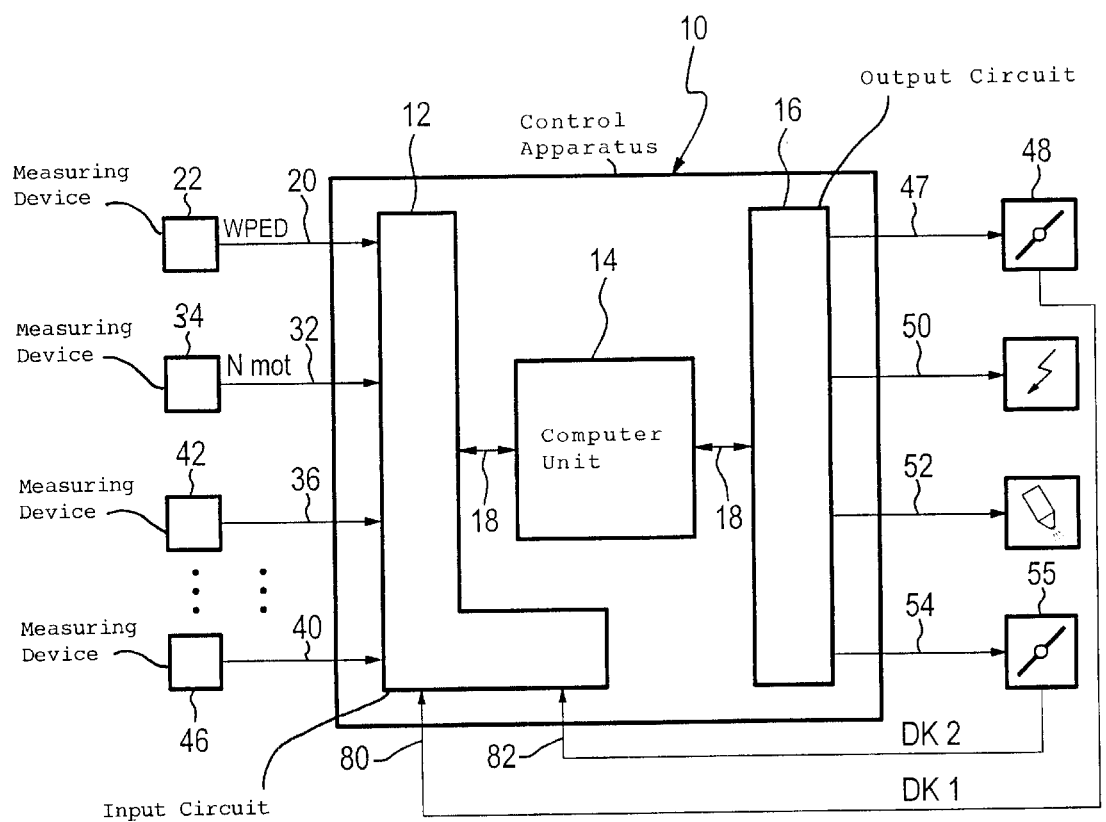
FIG. 1 shows a control arrangement for controlling an internal combustion engine having at least two power adjusting elements which are electrically driven independently.

FIG. 1 shows an electronic control apparatus 10 which includes at least one input circuit 12, at least one computer unit 14 and at least one output circuit 16. Input circuit, computer unit and output circuit are connected with each other via a communication system 18 for mutual data exchange. The following input lines lead to the input circuit 12: an input line 20 from a measuring device 22 for detecting a measurement quantity (WPED) for the position of an operator-controlled element actuated by the driver such as an accelerator pedal or fuel handle and input lines 36 to 40 from measuring devices 42 to 46 which detect additional operating quantities of the drive unit and/or of the motor vehicle which are needed for carrying out the functions executed by the control apparatus 10. These quantities include, for example, intake air temperature, engine temperature, ambient pressure, exhaust-gas composition, et cetera.

A signal, which represents the engine rpm Nmot, is supplied to the input circuit 12 from a measuring device 24 via an input line 32. Furthermore, the input circuit 12 is supplied with signals DK1 and DK2 via the input lines 80 and 82, respectively, which represent the current position of the at least two power adjusting elements (throttle flaps).

In one embodiment, at least one further line leads to the input circuit 12 which transmits a signal defining the ignition pulse which is detected at the primary end or the secondary end to the ignition coil. Furthermore, the segment times, which are assigned to the individual cylinders, are detected (for example, via a crankshaft angle transducer or a camshaft angle transducer). One segment corresponds to the angle of a complete engine revolution (with reference to the crankshaft 720°) divided by the number of cylinders. The time, which is needed for running through this angle, is known as the segment time. Ignition and injection are newly computed at the frequency of the segment times.

The electronic control apparatus 10 controls the adjusting elements via the output circuit 16 in accordance with the detected measurement quantities and especially in accordance with at least one of the measurement quantities determined by the measuring devices 22. A first power adjusting element 48 is driven via a first output line 47 and a second power adjusting element 55 is driven via a second output line 54. Both power adjusting elements are electrically actuable throttle flaps in the preferred embodiment. The positions of these throttle flaps are detected via corresponding measuring devices and are supplied via lines 80 and 82 to the control apparatus. Furthermore, the ignition time point of the individual cylinders is set via output lines 50 and the fuel metering to the individual cylinders is set via lines 52.

The measurement quantity WPED represents the position of the operator-controlled element and is read in by the computer 14 and converted into desired values for driving the power-adjusting elements 48 and 55. This conversion takes place, for example, by means of characteristic lines, characteristic fields, tables or computing steps and, if required, with a consideration of additional operating variables. These desired values are adjusted in the context of a position control loop by the formation of drive signals. The position control loop is closed by the feedback of the position of the particular power-adjusting element. The position of the particular power-adjusting element determines the charge which is applied to the cylinder or cylinder group assigned to the power-adjusting element. Because of the different characteristics of the power-adjusting elements, the charge exhibits different values for the same desired value with this charge being adjusted by the adjustment of the power-adjusting element. The deviation between the two values can amount up to some 10%.

Different torque contributions of the individual cylinders or cylinder groups result because of the different charge of the individual cylinders. This behavior is unwanted so that adaptation methods for synchronizing the throttle flaps and for equalizing the cylinders with respect to the torque generated are carried out before the engine is taken into service for the first time and/or during the running operation of the engine. This leads to the situation that the controls of the power-adjusting elements are so influenced that the charge to the individual cylinders or cylinder groups have essentially the same value and therefore the individual cylinders or cylinder groups make the same torque contributions.

For carrying out this synchronization, an index for the deviation of the torque contributions of two cylinders is determined, for example, the time-dependent difference in the ignition intervals of the cylinders or the time-dependent difference in the ignition intervals of selected cylinders of the individual cylinder groups or the difference in the respective segment times for a system having an increment transducer wheel or segment transducer wheel or the time-dependent difference of two times derived from the segments or the angular spacing of two sequential combustions. The ignition intervals are evaluated, that is, the time-dependent spacing of two sequential ignitions in a cylinder are evaluated or the other, above-mentioned times are evaluated in idle and/or at different operating points in the part-load range and in the full-load range as well as for different rpms. By opening and/or closing the power-adjusting elements, which are assigned to the respective cylinders, after there is a drop below a pregiven threshold value and/or this threshold value is exceeded, the equalization of the cylinders with respect to their torque contributions is achieved. The pregiven threshold value is of a difference of the times.

In the preferred embodiment, two throttle flaps are provided which are driven electrically independently of each other. At least one cylinder is assigned to each of these throttle flaps and the sequential combustion operations of these cylinders each exhibit a time-dependent spacing T1 or T2 (ignition spacing or segment times or combustion spacing, et cetera). For synchronizing the two throttle flaps, the determined times of the at least two cylinders are compared to each other in at least one operating point and, if required, for different rpms. If the time T1 is greater than the time T2 plus a pregiven threshold value X, then the throttle flap 1 is opened and the throttle flap 2 is closed until the times are both within the tolerance region pregiven by the threshold value X with respect to each other. Correspondingly, when the time T1 is less than the time T2 minus a threshold value Y, the throttle flap 1 is closed and the throttle flap 2 is opened until the two times are in the tolerance region. The threshold values can be the same or they can be different.

Offset values are formed from the extent of the opening or closing of the particular throttle flap. These offset values represent the corrections of the quantities influencing the throttle flap positions such as desired values, drive signals, et cetera. The corrections are necessary for the equalization of the cylinders with respect to the torque contributions generated for the actual operating point or for the further operation at all operating points.

In a first embodiment, only an offset value for all operating points is provided. Accordingly, the throttle flaps are opened or closed in synchronism in the provided idle position subsequent to the above-described procedure for cylinder equalization until the idle rpm is reached. This can lead to a change of the offset values.

In another embodiment, offset values are stored in a characteristic field so that for each operating point, the offset values, which effect the cylinder equalization, are stored. This characteristic field is then adapted in the above-described manner during operation of the engine. Here too, the original idle rpm is again reestablished after ending the synchronization via synchronous adjustment of the throttle flaps and, if required, changing of the offset values for the measured operating point.

The computation of the times takes place by determining the time-dependent spacing of the outputted ignition pulses which is carried out, for example, on the basis of a measurement signal or, within the computer, on the basis of the time points of the output of the ignition pulses to the corresponding cylinders or by determining the time duration of the individual segments. The measurement signal is taken off the ignition coil at the primary end or the secondary end.

The realization of the described procedure takes place in the preferred embodiment as a computer program. One example for such a computer program is presented in FIGS. 2 and 3 as a flowchart. FIG. 2 shows a flowchart which defines the actual synchronization operation whereas, in FIG. 3, the application of the corrective values during driving the power-adjusting elements during operation is shown.

The program shown in FIG. 3 is started, depending upon the embodiment, in predetermined time intervals or, for example, by a tester. In step 100, a check is made as to whether the conditions for carrying out the synchronization of the power-adjusting elements is present. This is, for example, the presence of a specific test condition, for example, an external signal when steady-state operating conditions, et cetera, are present. This program is ended if these conditions are not satisfied. If these conditions are present, the times T1 and T2 are read in in step 102. These times T1 and T2 relate to two different cylinders which are assigned to different power-adjusting elements.

In the next step 104, a check is made as to whether the time T1 is greater than the time T2 plus a pregiven threshold value X. If this is the case, then, in accordance with step 106, the throttle flap, which is assigned to the first cylinder, is opened, the throttle flap assigned to the second cylinder is closed and, in correspondence to the extent of the adjusting operation, the offset values for the control of the first throttle flap ΔDK1 and those for the second throttle flap ΔDK2 are changed (see step 108). After step 108, step 102 follows at the next runthrough time point.

If step 104 has shown that the time point T1 does not lie above the upper tolerance limit to time point T2, then, in step 110, a check is made as to whether the time point T1 is less than the lower tolerance threshold. If the time T1 is less than the time T2 less a pregiven threshold value Y. then, according to step 112, the throttle flap, which is assigned to the second cylinder, is opened and the throttle flap, which is assigned to the first cylinder, is closed. In correspondence to step 108, the offset values ΔDK1 and ΔDK2 are then adapted in step 114 in correspondence to the extent of the opening or closing operation. After step 114, the program is repeated at the next runthrough time point with step 102.

If it results also in step 110 that the times lie with respect to each other in the provided tolerance band, the synchronization of the throttle flaps is ended with a view to the equalization of the cylinders at this operating point. Then, if required, in accordance with step 116, a synchronous adjustment of the power-adjusting elements is made either in the opening or closing direction until the idle rpm of the engine is reached. This takes place, preferably, only when, for the entire operating range, an offset value pair is used and/or when the offset value pair, which covers the idle region, is determined. For example, for an input of the idle value for the throttle flap positions, these throttle flaps are synchronously adjusted, either in the opening or closing direction (with a change of the offset value pair or of the offset value pair covering the idle region) until the pregiven idle rpm is reached. This avoids that an idle rpm is adjusted which is too low or too high as a consequence of the determined offset value. If offset value pairs are provided outside of the idle region for different operating points, then step 116 can be dropped or respective other reference points are applied. After step 116, the program is ended and is run through at the next time point.

FIG. 3 shows a flowchart which shows the evaluation of the results of the synchronization of the at least two power-adjusting elements in normal operation. The desired value for the adjustment of the power-adjusting element is corrected by means of the stored offset value pair stored preferably in the context of a characteristic field in dependence upon operating point. The illustrated program is run through at pregiven time intervals.

In the first step 200, throttle flap desired values DK1DES and DK2DES are formed for controlling the two throttle flaps, which are electrically controlled independently of each other, in accordance with pregiven characteristic lines, tables, or characteristic fields. Thereupon, in the preferred embodiment, in step 202, the position values of the two throttle flaps DK1 and DK2 as well as the engine rpm Nmot are read in. In the next step 204, the offset values ΔDK1 and ΔDK2 are determined for the individual throttle flaps. In a first embodiment, one value pair is present for the entire operating range and, in another embodiment, the offset values are determined in dependence operating point. In the last-mentioned embodiment, for example, the respective offset values ΔDK1 and ΔDK2 are selected from a characteristic field of the respective position values DK1DES and DK2DES plotted against the engine rpm.

In the next step 206, the desired value is corrected, for example, by addition or multiplication with the selected offset values. On the basis of the desired value, which is corrected as in step 206, the drive signals τ1 and τ2 are formed in step 208 preferably, in accordance with a position controller. Thereafter, the program is ended and runs through again at the next time point.

In another embodiment, it is not the desired value which is corrected via the offset values but the drive signal quantities τ1 and τ2.

In one embodiment, it is not the two power-adjusting elements which are controlled in mutual opposition for synchronization; instead, an element is actuated to reduce the time difference whereas the other element is not moved.

The mutually opposing adjustment of the throttle flaps is not only carried out in combination with the detection of the time difference; but also when the different torque contributions of the cylinders are determined in another manner, for example, on the basis of the pressure, the air mass, the torque, the rpm, et cetera.

With the running of the synchronization, other changes, which influence the torque output of the individual cylinders, are to be prohibited (individual cylinders) or are to be permitted simultaneously only for all cylinders. Such changes which influence the output of the individual cylinders are, for example, ignition angle adjustment, adjustment of the air/fuel ratio, engine valve control for the selected cylinder.

It is understood that the foregoing description is that of the preferred embodiments of the invention and that various changes and modifications may be made thereto without departing from the spirit and scope of the invention as defined in the appended claims.

What is claimed is:

1. A method for synchronizing at least two power-adjusting elements of an internal combustion engine, the engine including at least first and second power-adjusting elements controlled electrically independently of each other, the first power-adjusting element adjusting the air supplied to at least a first cylinder of said engine and the second power-adjusting element adjusting the air supplied to at least a second cylinder of said engine, the method comprising the steps of:

determining a quantity representing the deviation of the torque contributions of said cylinders, respectively;

carrying out a correction of the position of at least one of said power-adjusting elements on the basis of said quantity to effect a reduction of said deviation; and, adjusting said power-adjusting elements while considering said correction.

2. The method of claim 1, wherein said quantity is one of the following: a deviation of time values assigned to said cylinders including the ignition interval as the time-dependent spacing or angular spacing of two sequential ignitions of one of said cylinders, the segment time assigned to said one cylinder or, a time derived from said segment time or, the angular spacing of two sequential combustions of said one cylinder.

3. The method of claim 1, wherein the cylinder-individual influencing of the combustion via measures including different ignition angles is not permitted during the synchronization.

4. The method of claim 1, comprising the further step of opening that power-adjusting element which is assigned to that cylinder whose time value is greater than the time value of the other cylinder assigned to said second power-adjusting element.

5. The method of claim 4, comprising the further step of closing the power-adjusting element of said second cylinder.

6. The method of claim 1, comprising the further step of closing the power-adjusting element which is assigned to that cylinder whose time value is less than the time value of the second cylinder which is assigned to said second power-adjusting element.

7. The method of claim 6, comprising the further step of opening said second power-adjusting element.

8. The method of claim 1, comprising the further step of:

forming an offset value in dependence upon opening and closing each of said power-adjusting elements; and, correcting the positions of said power-adjusting elements with said offset values so that the selected times are within a pregiven tolerance range.

9. The method of claim 8, comprising the further step of:

correcting said offset values; and, adjusting all of said power-adjusting elements in the same direction until the idle rpm of said engine is reached.

10. A method for synchronizing at least two power-adjusting elements of an internal combustion engine, the engine including at least first and second power-adjusting elements controlled electrically independently of each other, the first power-adjusting element adjusting the air supplied to at least a first cylinder of said engine and the second power-adjusting element adjusting the air supplied to at least a second cylinder of said engine, the method comprising the steps of:

determining an index for the determination of the difference in the torque contributions of said cylinders; and, oppositely adjusting the at least two power-adjusting elements in the sense of a reduction of said difference.

11. The method of claim 10, comprising the further step of opening that power-adjusting element which is assigned to that cylinder whose time value is greater than the time value of the other cylinder assigned to said second power-adjusting element.

12. The method of claim 11 comprising the further step of closing the power-adjusting element of said second cylinder.

13. The method of claim 10, comprising the further step of closing the power-adjusting element which is assigned to that cylinder whose time value is less than the time value of the second cylinder which is assigned to said second power-adjusting element.

14. The method of claim 13, comprising the further step of opening said second power-adjusting element.

15. The method of claim 10, comprising the further step of:

forming an offset value in dependence upon opening and closing each of said power-adjusting elements; and, correcting the positions of said power-adjusting elements with said offset values so that the selected times are within a pregiven tolerance range.

16. The method of claim 15, comprising the further step of:

correcting said offset values; and, adjusting all of said power-adjusting elements in the same direction until the idle rpm of said engine is reached.

17. An arrangement for synchronizing at least two power-adjusting elements of an internal combustion engine, the arrangement comprising:

a control apparatus for controlling said at least first and second power-adjusting elements electrically independently of each other; and, said control apparatus including means for determining a quantity representing the deviation of the torque contributions of two cylinders;

means for correcting the position of at least one of said power-adjusting elements to effect a reduction of said deviation; and, means for considering said correction when controlling the power-adjusting elements.

18. An arrangement for synchronizing at least two power-adjusting elements of an internal combustion engine, the arrangement comprising:

a control apparatus for controlling said power-adjusting elements electrically independently of each other; and, said control apparatus including means for determining an index for the determination of the difference in the torque contributions of the cylinders; and, means for oppositely adjusting said power-adjusting elements in the sense of a reduction of said difference.

* * * * *